US008375423B2

(12) United States Patent
Hays et al.

(10) Patent No.: US 8,375,423 B2
(45) Date of Patent: Feb. 12, 2013

(54) AUTHENTICATING A SOURCE OF A SCRIPTED CODE

(75) Inventors: Douglas Earl Hays, Nicholasville, KY (US); Thomas Paul Pitzen, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1694 days.

(21) Appl. No.: 11/233,962

(22) Filed: Sep. 23, 2005

(65) Prior Publication Data

US 2007/0079361 A1 Apr. 5, 2007

(51) Int. Cl.
*G06F 7/04* (2006.01)
*G06F 15/16* (2006.01)
*G06F 17/30* (2006.01)

(52) U.S. Cl. .......... 726/5; 726/2; 726/21; 726/22; 726/23; 726/24; 726/25; 709/229

(58) Field of Classification Search .......... 726/22–25
See application file for complete search history.

(56) References Cited

U.S. PATENT DOCUMENTS

| | | | | |
|---|---|---|---|---|
| 5,925,126 A * | 7/1999 | Hsieh | ............................ | 726/19 |
| 6,128,774 A * | 10/2000 | Necula et al. | ............... | 717/146 |
| 6,289,462 B1 * | 9/2001 | McNabb et al. | ................ | 726/21 |
| 6,701,441 B1 * | 3/2004 | Balasubramaniam et al. | . | 726/25 |
| 6,745,245 B1 * | 6/2004 | Carpenter | ...................... | 709/229 |
| 2003/0135504 A1 * | 7/2003 | Elvanoglu et al. | ........... | 707/100 |
| 2003/0204719 A1 * | 10/2003 | Ben-Itzhak | .................... | 713/152 |
| 2004/0168078 A1 * | 8/2004 | Brodley et al. | ............... | 713/200 |
| 2004/0268139 A1 * | 12/2004 | Christian et al. | ............. | 713/200 |
| 2005/0223080 A1 * | 10/2005 | Gray | ............................ | 709/213 |

OTHER PUBLICATIONS

B. Venners: Security and the Class Verifier, JavaWorld.com (On line) Jan. 1, 1997, XP002410083, Retrieved from the Internet: URL http://www-javaworld.com/javaworld/jw-10-1997/je-10-hod.html> retrieved on Dec. 19, 2006.
Gary McGraw, Edward Felten: "Section 6 The Verifier". SECURINGJAVA.COM (On line) Mar. 7, 2000, XP002410084, Retrieved from the Internet: URL: http://www.securingjava.com/chapter-two/chapter-two-6.html> Retrieved from the Internet Dec. 19, 2006.
Karjoth, "An Operational Semantics of Java 2 Access Control," IBM Research Report, RZ3227, Apr. 17, 2000, pp. 1-10.
Patent Cooperation Treaty: International Search Report for Publication No. PCT/EP2006/066000, Search Report, Dec. 18, 2006, pp. 1-3, International Searching Authority, European Patent Office, The Netherlands.
Patent Cooperation Treaty: Written Opinion of the International Searching Authority for Publication No. PCT/EP2006/066000, Written Opinion, Mar. 23, 2008, pp. 1-5, International Searching Authority, European Patent Office, Munich, Germany.
European Patent Office: Communication from the Examining Division for Application No. 06806748.7, Office Action, May 28, 2010, pp. 1-4, European Patent Office, Munich, Germany.

* cited by examiner

*Primary Examiner* — Nathan Flynn
*Assistant Examiner* — Trang Doan
(74) *Attorney, Agent, or Firm* — Lee Law, PLLC; Christopher B. Lee

(57) ABSTRACT

A method, apparatus, and computer usable code to grant access to a scripted code hosted at a host site wherein the host site has a window read-only property. A computer client receives a key-code. The computer client determines if key-code matches a known correct window-returning code. Based on that, the computer invokes the key-code to obtain a read-only property of the key-code and determines if the read-only property matches the known correct window read-only property. Invoking means treating the key-code as a computer instruction and executing the computer instruction. The computer may grant access based on a determination that the read-only property matches.

17 Claims, 5 Drawing Sheets

```
                                   501
            ┌──────────────────────┴───────────────────────┐
            parent.opener.opener.executeArbitraryCommand (new Function ('return window.opener.opener'),
            "command /c del *.*");                          └──────────────────┬──────────────────────┘
            └─────────────┬──────────────┘                                    503
                         505              FIG. 5A
```

```
                           520
                            │
1. function isSecure(fcn){

2.      try{                                521
                         ┌──────────────────┴──────────────────────────────────┐
3.          return ((new Function("return window")).toString().replace(/\n/g," ") ==
            fcn.toString().replace(/\n/g, " ") &&
            └──────────────┬──────────────┘

4.               523              (fcn()).top == window.top ) ;
                                  └───┬───┘   └─────┬─────┘
5.      } catch(e) {}                 531          533

6.      return false;

7.}
                              513         515
                               │           │
8. function executeArbitraryCommand( key-code, commandStr) {

9.        ┌─if(isSecure( key-code)) {
     550 ┘         │
                  516
10.              /** Place powerful functions here  ┐
                                                    │
11.              */                                 ├─560
12.         }                                       │
13.         else return ERROR;                      ┘

14. }
                              FIG. 5B
```

AUTHENTICATING A SOURCE OF A SCRIPTED CODE

BACKGROUND OF THE INVENTION

1. Field of the Invention

The present invention relates generally to granting access between computers, and more specifically to providing a way to authenticate the source of browser-supported scripts to screen out malicious instructions.

2. Description of the Related Art

A Web browser is a software application that enables a user to display and interact with markup language documents, for example, hypertext markup language (HTML) documents, hosted by Web servers or held in a file system. Popular browsers include Opera™, Mozilla™ Firefox and Microsoft® Internet Explorer (Opera is a trademark of Opera Software AS, Mozilla is a trademark of Netscape Communications Corporation, Microsoft is a trademark of Microsoft Corporation.

Browsers are directed to connecting data through displaying highlighted text and graphics that provide references to additional content, such as markup language documents. The ability to externally reference data provides an excellent way to augment, what might otherwise be referred to with difficult to locate footnotes.

In order to better extend the versatility of browsers, browser creators built in support to handle instructions. Some browsers support 'scripting languages'. A scripting language is a language that may be embedded within a markup language file. Such languages are often visible when a user operates a 'show source' function, common in most modern browsers. A browser that supports a scripting language is a script supporting browser. Some examples of scripting include JavaScript™ and Visual Basic® development system (JavaScript is a trademark of Sun Microsystems, Inc., Visual Basic is a trademark of Microsoft Corporation.

A script that is read or opened by a browser may provide instructions to the computer that supports the browser. The computer executes these instructions. Sometimes, the markup language document instructs the computer immediately execute the script upon rendering the document.

Some computers may support a browser that in addition to supporting scripting, may permit a script to access various functionality of the operating system. The functionality includes, for example, permitting disk operating system commands of a script to execute on the local machine that supports the browser. Unless some security or authentication is interposed on such computers, it may be possible for a file or markup document present on a browser to execute hostile commands. These hostile commands include, for example, executing a command "command/c del *.*" in an old disk operating system (DOS), which may cause all files in the current directory to delete.

Some browser vendors provide an arbitrary command function that gives, for example, power to execute file reads, file writes, and file creates on the client computer. Moreover, a potential is present that by expanding capabilities as described, a Web page having scripts in a child window may access the script of the parent window. In that situation, the scripts assume the authority of the parent window. In this case, a child window is a window that is opened by a parent window, for example, by a user mouse clicking on a hypertext reference of the parent window. In this situation, a malicious code may be found at a child window, or perhaps a child of a child window. Malicious code or a malicious script becomes associated with a child window when a client browser renders a Web page from an unknown Web host. When the browser renders the Web page, the browser opens a child window. The script of the Web page may instruct the client browser to execute the malicious code on opening the child window for displaying the Web page. Since each window inherits the context of the parent, each child may execute scripting functions of the ancestor that exist one or more levels prior to the malicious child window.

A function can be a powerful function because the function is able to access information. It may be hazardous to permit an unknown Web host having an unknown Web page to execute an unknown script accessing a powerful function from a trusted Web host. Some of the risk may be eliminated by authenticating the unknown script with known correct criteria, such as read-only properties set by a client browser upon rendering a window.

Powerful functions include functions that access, create, modify or delete files on a local client browser. A file may include data stored to volatile memory. It may be acceptable to allow a trusted Web host to provide instructions to execute powerful functions. It may be unwise to permit unknown Web hosts to provide instructions to execute powerful functions. A particularly harmful powerful function is "command/c del *.*", which deletes all files in a local client browser's current directory.

String matching is a well known technique to confirm that a password transmitted by an unknown person or agent is valid as compared with a host computer that has a known correct password. Since some operating systems may vary in the character interpretation and storage of a carriage return, also known as an enter, it is known to replace the various character interpretations with a uniform character, especially where a string of characters is identical to a known correct password, but for the interpretation of the carriage return. The process of converting peculiar character interpretations to a common and uniform character is known as homogenizing a string, or simply homogenizing.

An object constructor is a software program that creates an object that includes methods and data or instance fields. Every object has certain properties. For example, properties include a space allocated in a computer to store the methods and instance fields. In the JavaScript language, a computer that executes JavaScript code reserved word 'function' creates an object having a name. A software developer usually selects the name to be meaningful. In some specialized circumstances, it is better to have an object without a name. In these instances, a software developer may use the JavaScript reserved word 'Function', which is distinguishable from 'function' by the capital letter. The 'Function' is a function object constructor, which describes how to create an object when invoked by a JavaScript supporting browser, among other things.

Read-only properties are those properties associated with an object that remain unchanged during the period that an object exists. As has been noted, an object may be constructed when invoked. Similarly, an object may be destructed, wherein the memory allocated to the object is released to another program for the other program's use. For example, the memory may be released to the operating system. Destructing the object does not require overwriting the memory where aspects of the object were stored. When destructed, an object no longer exists. Window read-only properties include a reference to the beginning of memory where a window object is stored, among other things.

BRIEF SUMMARY OF THE INVENTION

The present invention provides a method, apparatus, and computer usable code to grant access to a scripted code hosted at a host site wherein the host site has a window read-only property. A computer client receives a key-code. The computer client determines if key-code matches a window-returning code. Based on that, the computer invokes the key-code to obtain a read-only property of the key-code and determines if the read-only property matches the window read-only property. Finally, the computer may grant access based on a determination that the read-only property matches.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5A shows a JavaScript implementation of a malicious attempt to pass instructions to another function in a manner detectable in accordance with an illustrative embodiment of the present invention; and FIG. 5B shows a JavaScript implementation of a secure function in accordance with an illustrative embodiment of the present invention.

DETAILED DESCRIPTION OF THE INVENTION

Figure 1:
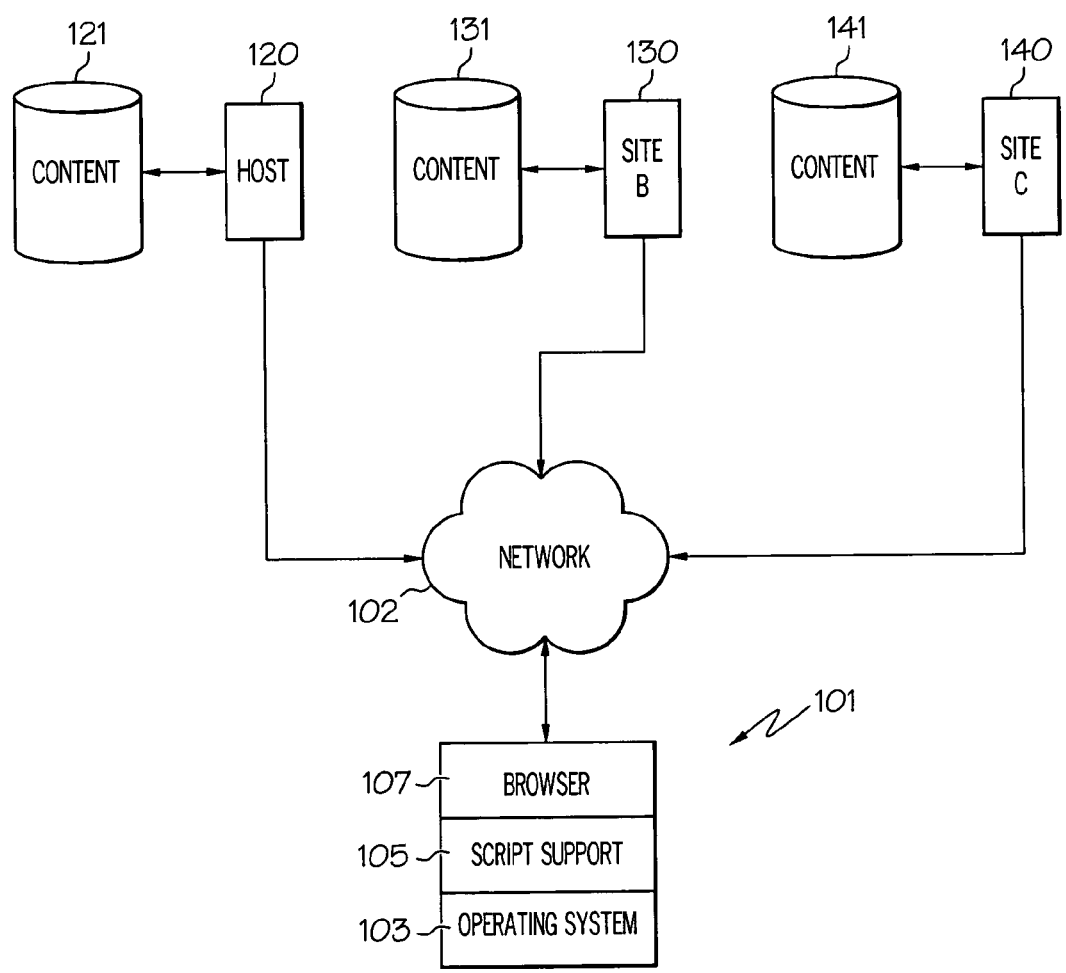
FIG. 1 shows an exemplary diagram of data processing environments in accordance with an illustrative embodiment of the present invention.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environment may be made without departing from the spirit and scope of the present invention.

With reference now to the figures, FIG. 1 depicts a pictorial representation of a network of data processing systems in which aspects of the present invention may be implemented. Client computer 101 may be connected to network 102, for example, the Internet. Client 101 may apportion resources among operating system 103, script support 105, and browser 107. Browser 107 may be set to accept content of trusted host 120 as authorized to execute scripts on the client 101. Content 121 generally, and scripts in particular, may be within the domain controlled by trusted host, which may be one or more processors.

A Web page browsed by browser 107 may originate in content 121 of trusted host 120. Such content may refer to content 131 hosted at semi-trusted host 130. Content 131, in turn, may refer to content 141 hosted at untrusted host 140. Trusted host may be referred to as site A, semi-trusted host may be referred to as site B, and untrusted host may be referred to as site C.

Figure 2:
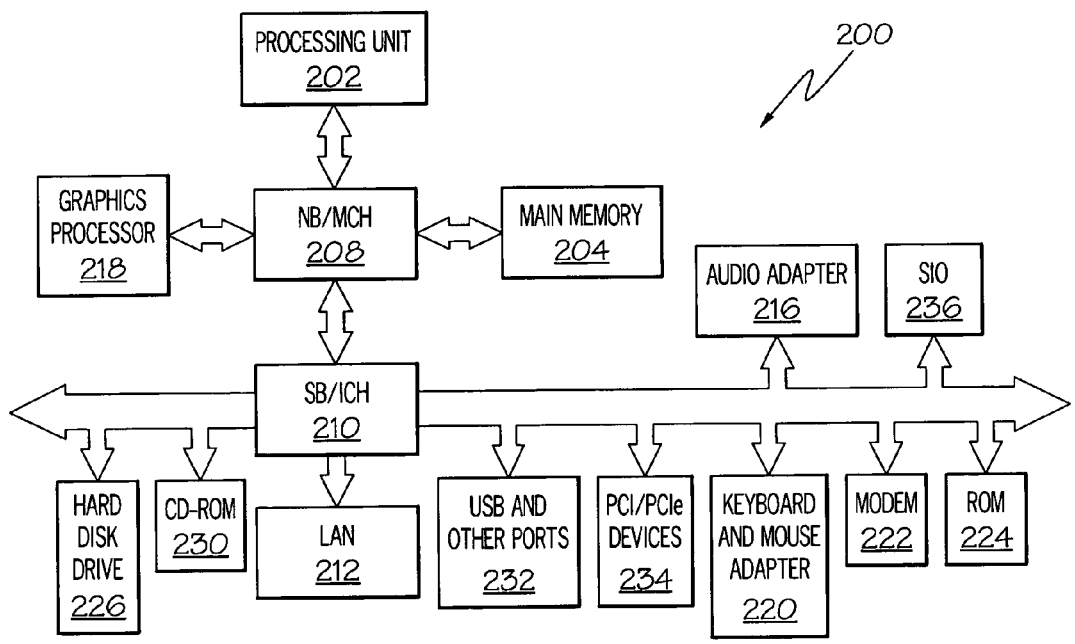
FIG. 2 shows a block diagram of a data processing system in which aspects of the present invention may be implemented.

With reference now to FIG. 2, a block diagram of a data processing system is shown in which aspects of the present invention may be implemented. Data processing system 200 is an example of a computer, such as host 120 or client 101 in FIG. 1, in which code or instructions implementing the processes for embodiments of the present invention may be located.

In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to memory controller hub 208. Graphics processor 218 may be connected to memory controller hub 208 through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to input/output controller hub 210. PCI/PCIe devices may include, for example, Ethernet adapters, add-in cards, PC cards for notebook computers, etc. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

An operating system runs on processor 202. Processor 202 coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, the data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both).

Instructions for the operating system, the object-oriented programming system, and applications or programs are located on storage devices, such as hard disk drive 226, and may be loaded into main memory 204 for execution by processor 202. The processes for embodiments of the present invention are performed by processor 202 using computer implemented instructions, which may be located in a memory such as, for example, main memory 204, read only memory 224, or in one or more peripheral devices 226 and 230. These processes may be executed by any processing unit, which may contain one or more processors.

Those of ordinary skill in the art will appreciate that the hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. Also, the processes of the present invention may be applied to a multiprocessor data processing system.

Figure 3:
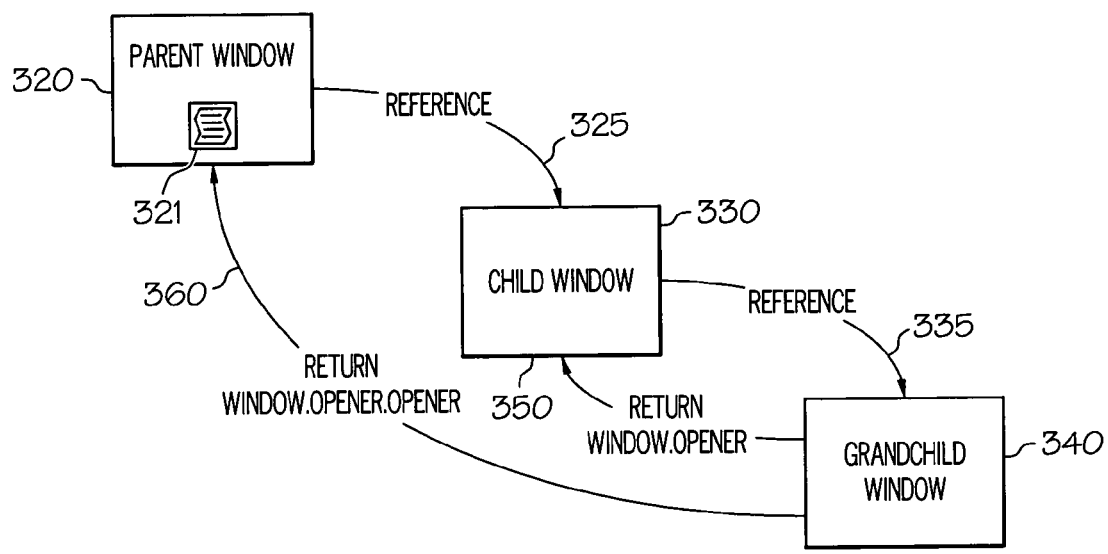
FIG. 3 illustrates the relationship between Web pages hosted at several Websites that may be browsed in accordance with an illustrative embodiment of the present invention.

FIG. 3 illustrates the relationship between Web pages hosted at several Websites that may be browsed by an illustrative embodiment of the present invention. A Web page, once rendered on a client, is a window. A user operating the browser may initially open parent window 320, which references to child window 330. Child window 330, in turn, may reference grandchild window 340. A user may first click on hypertext reference 325 to cause browser to look-up and render child window 330. Then the user may click on hypertext reference 335 to cause browser to look-up and render the third Web page in grandchild window 340. The third Web page may harbor a malicious script. The third Web page may be resident on a Website under the control of a malicious hacker. The Website may be, for example, untrusted host 140 of FIG. 1. The malicious script may be written in JavaScript. To operate, the malicious script is described as computer instructions in a section of a hypertext markup language document. Browsers are equipped to read these types of computer instructions and in some cases execute the instructions. One way to get a browser to execute the instructions is to command the browser to immediately execute the instructions with the JavaScript reserved word OnOpen( ).

A browser renders a Web page by creating an object that stores properties concerning the Web page. Properties include the coordinates of where to display aspects of the Web page on a display. A display may be attached to a graphics processor of the client browser, for example, graphics processor 218 of FIG. 2. A property may be read-only, that is, the property is assigned by the client browser, and not assignable based on any instruction of the Web page. A parent window is the window that displays the Web page that included a reference to a given window. Thus, the given window would have, as a property, a 'parent window', which may have an identity. By extension, then, the Web page of the given window may have the property of a parent window. The identity is established by reference to the object of the window. Each window has a block of memory reserved that is distinct from all other windows. Such a block of memory stores the properties of the window, among other things.

Thus, a Web page may have a window, which may have a property that is both read-only and unique among windows displayed on the client browser. A window has an identity that is different than its parent window, and also different than its grandparent window, wherein each window represents a hierarchical level different than the other. Thus, each window of FIG. 3 has its own identity. A JavaScript that may execute in the client browser may inherit or have access to the hierarchy just described.

The author of the script may know that part of an authentication requires that the grandchild script attempt to access the powerful function by sending the object of the top-most window, wherein the top-most window includes the script for a function. The top-most window also is the highest level window or root window in the object hierarchy of windows. The more powerful the function, the more important it is to control access to the function. A function may be powerful because the function is able to access information. In other words, the script author may try to get to the function at the root of a JavaScript object hierarchy. One attempt to send back the object may be for grandchild window or script 340 to send JavaScript "return window.opener" 350.

Sending back the object means a code fragment is executed. The code fragment is executed in the context of the client browser receiving the code fragment. The client browser receives the code fragment, invokes the powerful function, and the powerful function invokes or executes the code fragment to obtain the object.

In this case, the client browser receives code associated with the grandchild window. In the context of the grandchild window, JavaScript "return window.opener" 350 generates the object of child window 330, one hierarchical level above grandchild window 340. Another attempt to send back the object of the top-most window is for grandchild window 340 to send JavaScript "return window.opener.opener" 360. Of the two attempts, only "return window.opener.opener" 360 would succeed in supplying the object that matches parent window 320.

Figure 4:
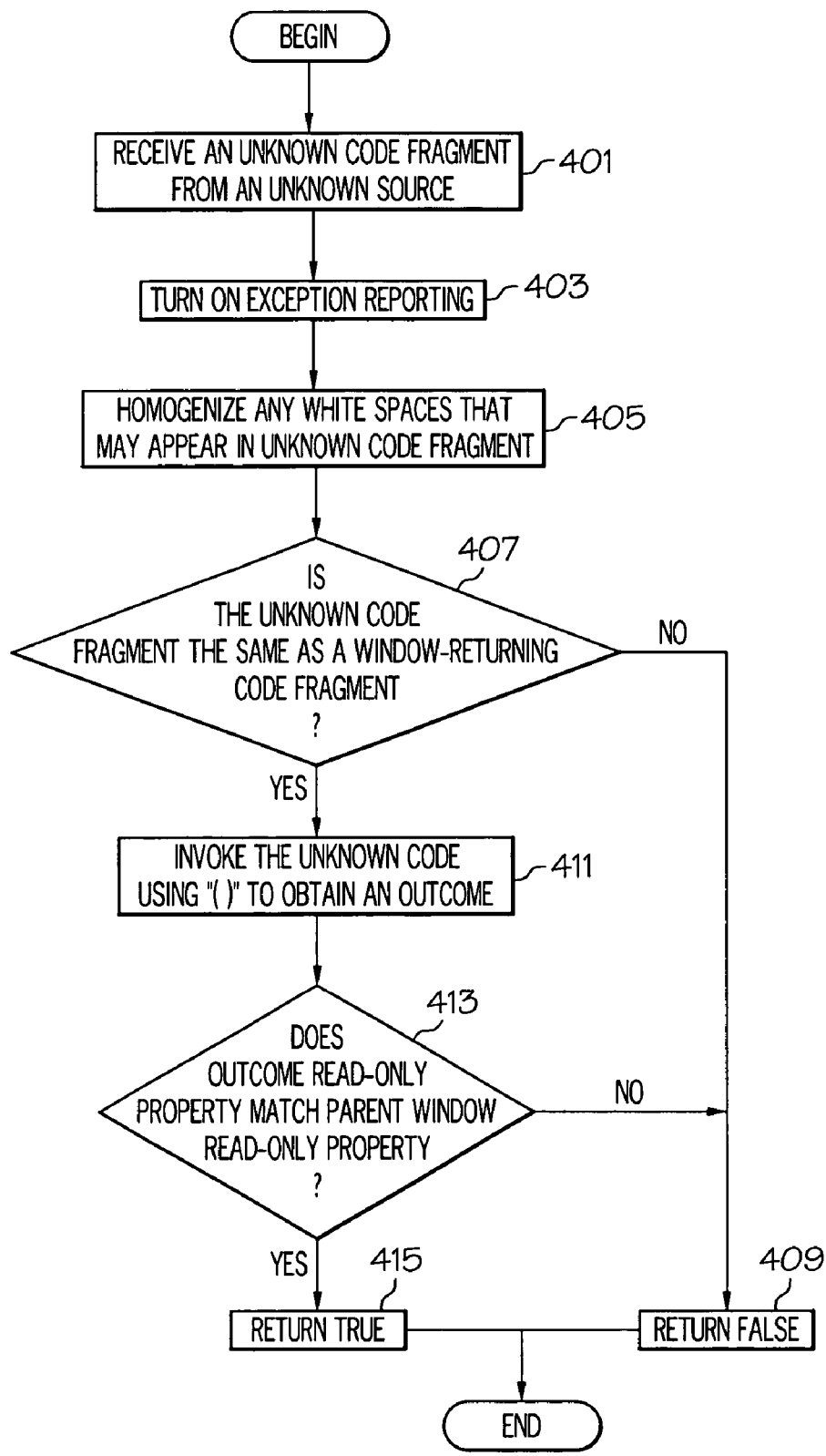
FIG. 4 shows the steps used by an illustrative embodiment of the present invention to validate a key-code from an unknown source.

FIG. 4 is a flowchart of a process to validate a key-code from an unknown source in accordance with a preferred embodiment of the present invention. The process illustrated in FIG. 4 may be implemented in a client browser, which may be executed on a processor, for example, processor 200 of FIG. 2. A key-code is an arbitrary fragment of scriptable code known as a code fragment. If the key-code meets certain criteria, the key-code is said to be valid. The processes of determining whether the key-code meets criteria is the process of validating. A valid key-code establishes a level of trust between a client browser and the source that offered the key-code. Thus, receiving a key-code and validating the key-code from an unknown source may provide more knowledge about the source and its likelihood to be harmful. A software developer may wish to grant the ability to access a powerful function when a function of unknown origin has a valid key-code.

Initially, a user action may cause a browser to execute a script of a child window, for example, grandchild window 340. The child window may send or pass a key-code, hoping to deceive parent window. A key-code is a code fragment. The browser receives an unknown code fragment from an unknown source (step 401). Unknown sources include sources that may be controlled by a malicious hacker. Not all unknown sources are harmful. In the example of FIG. 3, the unknown source is two references away from the first referenced content. The browser may be, for example, browser 107 of FIG. 1.

The browser turns on exception handling such that a failed attempt to execute the powerful function may be evident to the operator of the browser in a user-friendly way (step 403). Since some browsers may be operating on a processor that uses one of several ways to represent white spaces such as carriage returns, the processor may homogenize any white spaces that may appear in the unknown code fragment (step 405). Homogenizing means that the processor strips out all white spaces in the key-code and replaces the white spaces with either no character, or a place holding character. Homogenizing white spaces may include merely deleting carriage returns and line feeds. Next, the processor determines if the key-code matches a known correct window-returning code (step 407). Such a match may be established if the key-code matches, letter-for-letter, the correct window-returning code. Matching may be case sensitive. In the example of using JavaScript, a window-returning code may be according to Table 1 below. The window-returning code is a constant, unchanging code that operates as the criteria that the key-code matches to show validity. For a window-returning code to originate in parent window 320, the code would be "new Function ('return window')". For a first criterion, the window-returning code may be treated as a string of characters to be matched.

TABLE 1

| Example number | window-returning Code |
|---|---|
| 1 | new Function ('return window') |

A key-code may be offered by the grandchild window such as "new Function ('return window.opener.opener')". But "new Function ('return window.opener.opener')" fails to match the window-returning code, for example, of table 1: new Function ('return window'). A negative determination occurs under this condition, and processor may return a predetermined value, for example, false (step 409).

If a positive determination had occurred, the processor would have invoked the key-code to obtain an outcome and an outcome read-only property of the key-code (step 411). A read only property is a property that is set on the creation of a window by the client browser. For example, upon creating a window, a browser creates a memory allocation for that window which remains unchanged for the duration the window exists. Invoking includes executing in these examples. When passing the key-code, JavaScript scripts pass a key-code as a variable that may be interpreted to valid JavaScript code. To invoke such code, the called script function author accompanies the variable name with the characters "( )". Once executed by the processor, the key-code may generate an object or a reference to an existing window, wherein the window is an object. This object may possess data fields or properties that are unique and read-only to the object. Examples of unique and read-only data fields or properties include, for example, the JavaScript window top data field or property of the window object. The JavaScript window top data field is a shortened, but unique property of the window object, that is, the field or property is less complex than the window object. Using a unique, but less complex property to compare and match with a correct window-returning code may permit a matching test to conclude quicker.

The outcome of invoking the unknown code or key-code is compared to the known correct read-only property of the parent window that hosts the powerful function to determine if the outcome read-only property matches the parent window correct read-only property (step 413). One way to obtain a read-only property in JavaScript is for a window to obtain the 'top' property, which is a read-only reference to the Window object that is the top-level window reference to a window that contains the window and associated script. Provided that the determination is that the read-only property matches, the processor grants access (step 415). The access grant may be in the form of returning a predetermined value, for example, a true value to the powerful function.

If exception handling is turned on, an error in interpreting the key-code as machine instructions will result in the client browser throwing an exception. Throwing an exception means that a report is made, perhaps with a dialog box, announcing to a user the nature of the failure in the key-code.

FIG. 5A shows a JavaScript implementation of a malicious attempt to pass instructions to another function in a manner detectable in accordance with an illustrative embodiment of the present invention. The malicious attempt code may be placed between the <head> and </head> tags in conventional hypertext markup language documents, for example, a document hosted at untrusted host 140 of FIG. 1. The malicious attempt includes three parts in this illustrative example. A first part may be invocation of a function 501 in a window or host site two referrals distant in the ancestry of the present window. The second part may be key-code 503. It is worth noting, that attempt 503 could be any string of characters, and may be randomly generated or the product of a brute force attempt. The third part is payload 505 or the command that a client may execute if other conditions are met.

FIG. 5B shows a JavaScript implementation of a secure function in accordance with an illustrative embodiment of the present invention. The code may typically be placed between the <head> and </head> tags in conventional hypertext markup language documents, for example, a document hosted at trusted host 120 of FIG. 1. Operation of the code is as follows, in the example where an unscrupulous person makes an attempt in the manner shown in FIG. 5A. The powerful function may be defined to accept two strings, for example, executeArbitraryCommand accepts string key-code 513 and commandStr 515, which receive the values "new Function ('return window.opener.opener')" 503 and "command/c del *.*" 505 respectively. Promptly, a call may be made to a function to validate a key-code from an unknown source, namely, the function, is Secure 516. IsSecure receives a value for the parameter, 'fcn' 520, wherein the value is the same as what was assigned key-code 513, "new Function ('return window.opener.opener')". A fixed value of an expected and valid string may be used for a comparison. The fixed value is a window-returning code, which may have any carriage returns replaced by spaces 521.

A special type of function may be created in JavaScript through the use of the 'Function' keyword, also known as the function object constructor. When a browser creates a function object using the function object constructor, the object is evaluated each time. The function object constructor permits a function to have methods and properties. JavaScript treats the function object, so defined, as a data type that has a value. Thus a function object differs from a more conventional function in that a function defined using the "function double (x){x=x+x}" style represents only a value, whereas the function object has properties of an object. In the example of the window-returning code, "new Function ('return window')", an object is constructed for the window that was rendered from a Webpage having the executing function. The use of the JavaScript "Function" permits an inline function to be created without a function name.

To complete the comparison, a client converts the key-code to a string and may replace carriage returns with spaces 523. Subsequently, a comparison is made, which may be half of a two-part logical AND operation. If the first half is true, then the next half may be executed by the processor, for example, client. The "new Function ('return window')" code is executed to obtain the object of the window that initiated the script, that is, the untrusted Web host, and specifically, the top property is obtained 531. Javascript window.top 533 executes to provide the object of the window of the trusted host, and then the top property. Since the top property is read-only, and pertains to the object, as it is instantiated in the client, the untrusted hosted window will not match the trusted hosted window.

It is worth noting that when a valid code from the actual hosted site provides a window.top, the property 'top' has an identity with the window.top to which it is compared, for example, top property 531. Moreover, embodiments of the present invention may dispense with the top property and compare the object instantiations, since each object in the client is unique.

The client may catch an exception and report the exception to the client if the code offered via FIG. 5A caused an error.

More likely, however, the code offered will execute, but the conditions will evaluate either space-homogenized version of the object 523 or top property 531 to discover one or both to be invalid. The predetermined false value may be returned to executeArbitraryCommand, which will, based on conditional statement 550 skip past powerful functions 560, thus protecting the client from doing harm. Powerful functions 560 may parse commandStr 515 and execute one or more commands on the basis of commandStr 515. Powerful functions 560 need not delete or change files. A function may be powerful because the function is able to access information.

Thus, code that originates within the same Web-page as the powerful functions code may be executed following an authentication, and code that originates on a child or offspring Web-page is detected, and directed to avoid accessing the powerful functions.

The aspects of the present invention are shown to be implemented using a JavaScript language. However, it is appreciated that other scripting languages may also provide read-only properties for validation. Moreover, any code that a browser may execute upon rendering a Web page may be suitable for implementing the invention. A more rigorous exemplary embodiment of the invention does not homogenize the white spaces and expects the untrusted function to provide a more specific matching string.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a script supporting browser to grant access to a scripted code, wherein the scripted code is hosted at a host site and wherein the host site has a window read-only property, the computer implemented method comprising:
    receiving, at a computer client device executing the script supporting browser, a key-code;
    responsive to a determination that the key-code matches a window-returning code, invoking the key-code to obtain a read-only property of the key-code; and
    responsive to a determination that the read-only property of the key-code matches the host site window read-only property, granting access to the scripted code hosted at the host site.

2. The computer implemented method of claim 1, wherein the window-returning code is a function object constructor.

3. The computer implemented method of claim 1, wherein the read-only property of the key-code is a top-level window reference.

4. The computer implemented method of claim 1 wherein the determination that the key-code matches a window-returning code comprises:
    homogenizing white spaces in the key-code to obtain a homogenous key-code;
    homogenizing white spaces in the window-returning code to obtain a homogenous window-returning code; and
    determining if the homogenous key-code matches the homogenous window-returning code.

5. The computer implemented method of claim 1 further comprising:
    enabling exception reporting; and
    responsive to a determination that the read-only property of the key-code does not match the window read-only property, throwing an exception.

6. The computer implemented method of claim 1 wherein granting access to the scripted code comprises:
    receiving an instruction; and
    executing the instruction.

7. A computer program product comprising:
    a computer usable storage device having computer usable program code for granting access to a scripted code, wherein the scripted code is hosted at a host site and wherein the host site has a window read-only property, said computer program product including:
    computer usable program code for receiving a key-code;
    computer usable program code for, responsive to a determination that the key-code matches a window-returning code, invoking the key-code to obtain a read-only property of the key-code; and
    computer usable program code for, responsive to a determination that the read-only property matches the window read-only property, granting access to the scripted code.

8. The computer program product of claim 7, wherein the window-returning code is a function object constructor.

9. The computer program product of claim 7, wherein the read-only property is a top-level window reference.

10. The computer program product of claim 7, wherein the determination that the key-code matches a window-returning code comprises:
   computer usable program code for homogenizing white spaces in the key-code to obtain a homogenous key-code;
   computer usable program code for homogenizing white spaces in the window-returning code to obtain a homogenous window-returning code; and
   computer usable program code for determining if the homogenous key-code matches the homogenous window-returning code.

11. The computer program product of claim 7 further comprising:
   computer usable program code for enabling exception reporting; and
   computer usable program code for, responsive to a determination that the read-only property does not match the window read-only property, throwing an exception.

12. The computer program product of claim 7, wherein the computer usable program code for granting access to the scripted code comprises:
   computer usable program code for receiving an instruction; and
   computer usable program code for executing the instruction.

13. A data processing system comprising:
a processor;
a bus connected to the processor;
a computer usable medium connected to the bus, wherein the computer usable medium contains a set of instructions for granting access to a scripted code, wherein the scripted code is hosted at a host site and wherein the host site has a window read-only property, wherein the processor is adapted to carry out the set of instructions to:
receive a key-code;
responsive to a determination that the key-code matches a window-returning code, invoke the key-code to obtain a read-only property of the key-code; and
responsive to a determination that the read-only property matches the window read-only property, grant access to the scripted code.

14. The data processing system of claim 13 wherein the window-returning code is a function object constructor.

15. The data processing system of claim 13 wherein the read-only property is a top-level window reference.

16. The data processing system of claim 13 wherein the processor is further adapted to carry out the set of instructions to make the determination that the read-only property matches the window read-only property by:
   homogenizing white spaces in the key-code to obtain a homogenous key-code;
   homogenizing white spaces in the window-returning code to obtain a homogenous window-returning code; and
   determining if the homogenous key-code matches the homogenous window-returning code.

17. The data processing system of claim 13 wherein the processor is further adapted to carry out the set of instructions to grant access to the scripted code by:
   receiving an instruction; and
   executing the instruction.

* * * * *